Nov. 10, 1964 E. REED 3,156,152
SELF-TAPPING DRIVING SCREW FASTENER
Filed Sept. 8, 1961
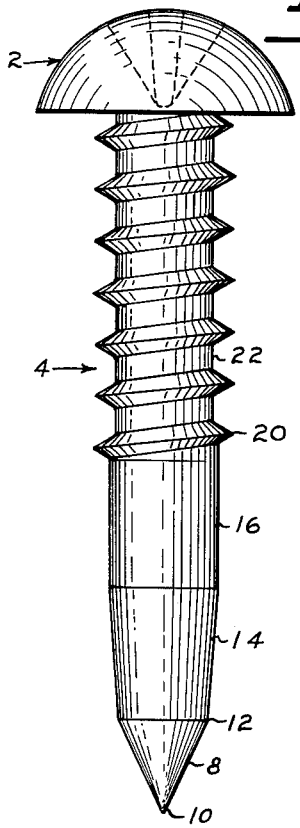
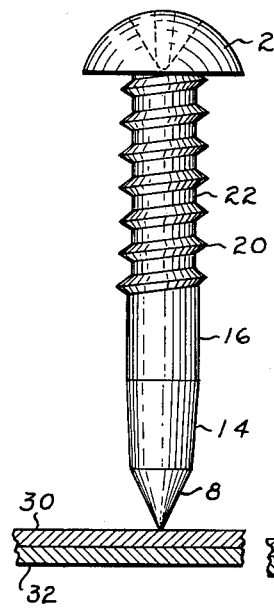
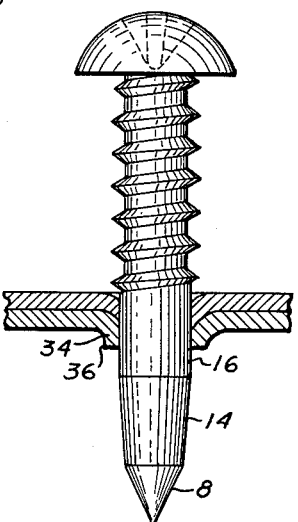
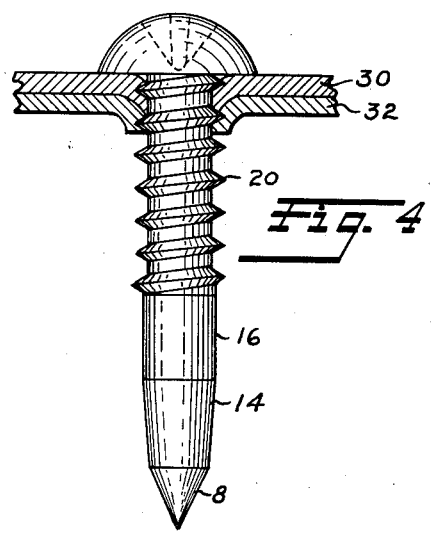
INVENTOR
EDGAR REED
BY Scrivener & Parker
ATTORNEYS United States Patent Office 3,156,152
Patented Nov. 10, 1964

3,156,152
SELF-TAPPING DRIVING SCREW FASTENER
Edgar Reed, Worcester, Mass., assignor to Reed & Prince Manufacturing Company, Worcester, Mass., a corporation of Massachusetts
Filed Sept. 8, 1961, Ser. No. 136,885
1 Claim. (Cl. 85—41)

This invention relates broadly to fasteners and, more particularly, to threaded self-tapping fasteners adapted and intended for use in connecting together two or more superposed metal sheets. In even greater particularity, the invention has to do with self-tapping screw fasteners of the type in which the shank of the screw has a smooth, un-threaded entering portion which is driven into and through the superposed metal sheets, forming a hole therethrough in the annular wall of which the thread on the following portion of the shank forms a thread to connect the sheets together through the intermediary of the thread of the fastener.

It has been the principal object of the present invention to provide a fastener of the type most particularly described above, having a smooth, un-threaded, entering end of new and improved construction which, when driven into and through superposed metal plates, will form a hole having an annular wall which is burnished and straight and of improved quality for acceptance of the threaded portion of the shank of the screw. A further object of the invention has been to provide a tapping screw of the described type, the un-threaded portion of the shank of which is so constructed as to provide a piercing action which will drive the screw through metal of greater thickness than is possible with similar fasteners of known construction. In this connection, another object has been to provide a tapping screw having a shank with an un-threaded entering portion and a threaded following portion in which the relation of the diameter of the un-threaded portion is, or the diameters of various parts of the un-threaded portion are, so related to the root diameter of the thread that the force required to produce the tapping action of the thread is less than in screws of the same type but of known constructions.

The invention is described in the following specification and is illustrated in the accompanying drawing, in which:

FIG. 1 is a side elevational view of a self-tapping screw having the new construction provided by the invention;

FIG. 2 is a side elevational view showing the screw about to be driven into and through superposed metal sheets, which are shown in section;

FIG. 3 is a view similar to FIG. 2 but showing the screw at the end of its piercing action and before the thread of the screw has engaged the metal sheets;

FIG. 4 is a view similar to FIG. 2 but showing the screw at the end of the threading action, and FIG. 5 is an axial view of the screw taken from the entering end thereof.

Self-tapping screw fasteners of the type to which this invention particularly relates comprise a head and a shank, the latter having an un-threaded, smooth part extending from its pointed entering end throughout a part of the length of the shank, the remainder of the shank being threaded to tap the annular wall of the hole formed when the un-threaded entering part of the shank is driven into and through one or more sheets of metal. The screw provided by this invention has all of these parts which are, however, of improved construction and relation to each other whereby much improved piercing and tapping actions are provided.

The screw provided by the invention is disclosed in FIG. 1 and comprises a head denoted generally as 2 and a shank denoted generally at 4. The head may be of any type such as flat, round, pan, oval, truss, or other but preferably has the Reed & Prince or Frearson type tool receiving recess 6. This preferred type of recess is well known and need not be further described here, except to say that because of the wedge shape and configuration of this recess there is little "bounce back" when the unthreaded portion of the shank is driven into metal by the blows of a hammer on the end of a driver having its driving end within the recess in the head.

The improvements provided by this invention have to do with the configuration of the un-threaded portion of the crank and the relation of its parts to each other and to the threaded portion of the shank. In the preferred form of the invention the un-threaded and threaded portions of the shank are of approximately equal lengths and together comprise the entire length of the shank. The un-threaded portion of the shank has, at the entering end thereof, a first part having a conical surface 8 extending from the pointed entering end 10 of the screw to an annular peripheral edge 12. Adjacent this conical part in the direction of the head of the screw there is provided a second part having a frusto-conical surface 14, and adjacent this part in the direction of the head of the screw there is provided a third part having a cylindrical surface 16. The parts 14, 16 are of approximately equal lengths and are, in the preferred form of the invention, slightly longer than the pointed end part 8. The frusto-conical surface 14 is divergent from the peripheral base edge 12 of the conical end part 8 in the direction of the head and it has been found that best results are obtained if this surface is divergent at an angle of approximately 6° to the axis of the shank.

The thread 20 of the screw extends from the end of the cylindrical part 16 of the un-threaded portion of the shank to the under surface of the head 2 and, as stated, covers approximately one-half the overall length of the shank. This thread has a root diameter which is less than the diameter of the cylindrical part 16 of the un-threaded portion of the shank, as clearly shown at 22. The difference in the diameters of these parts is sufficiently small and the pitch diameter of thread 20 is sufficiently large, however, that the pitch diameter of the thread is greater than the outside diameter of the cylindrical part 16, so that the thread has secure engagement with the metal of the two sheets which it taps.

The action of the screw in connecting two superposed metal sheets 30, 32 is illustrated in FIGS. 2, 3 and 4. In FIG. 2 the screw is shown with its pointed entering end 10 resting on the un-perforated sheets and ready to be driven through them. In FIG. 3 the screw is shown at the end of the movement of the un-threaded portion of the shank through the sheets with the thread about to engage the upper sheet. Because of the action of the conical end part 8, the frusto-conical part 14 and the cylindrical part 16 of the un-threaded portion of the shank the annular wall 34 of the hole made by the un-threaded portion of the shank is smooth and the flaring edge part 36 of the lowermost sheet is not torn or broken. This annular wall 34 therefore provides an optimum surface for engagement by the thread.

FIG. 4 shows the screw fully engaging the two sheets with the thread 20 having completed the tapping of the surface 34 formed by the un-threaded portion of the shank. Because of the fact that the root diameter 22 of the thread is less than the diameter of the cylindrical part 16 of the shank the thread will be formed in the surface 34 with less driving effort than if the root diameter were the same as the diameter of part 16. However, as the pitch diameter of the thread is greater than the diameter of the cylindrical part 16 by any desired amount there will be firm attachment between the sheets 30, 32 through the intermediary of the thread.

While I have described and illustrated one form which my invention may take, it will be apparent to those skilled in the art to which it relates that other embodiments, as well as modifications of that disclosed, may be made and practiced without departing in any way from the spirit or scope of the invention, for the limits of which reference must be made to the appended claim.

What is claimed is:

A self-tapping screw fastener comprising a shank and a head, the shank comprising a portion having a smooth exterior surface extending from the entering end of the screw toward the head for approximately one half the length of the shank and comprising a conical part the point of which forms the entering end of the screw, a flared part having an outer surface extending from the base of the conical part and diverging toward the head at an angle of approximately 6° to the axis of the shank, and a third part having a cylindrical outer surface extending from the flared part to the end of said smooth exterior surface portion of the shank, said conical part having an outer surface diverging toward the head at an angle greater than 6° with respect to the axis of the shank, said flared part and said cylindrical part being approximately equal in length and greater in length than said conical part, and a thread extending from the end of the smooth exterior surface portion of the shank to the head, the root diameter of the thread being less than the diameter of said cylindrical part and the pitch diameter of the thread being greater than the diameter of said cylindrical part, said pitch diameter being constant throughout its length.

References Cited by the Examiner

UNITED STATES PATENTS

| 161,529 | 3/75 | Litchfield et al. | 85—41 |
| 1,980,093 | 11/34 | Rosenberg | 85—46 |
| 2,015,159 | 9/35 | Rosenberg | 85—44 |

FOREIGN PATENTS

| 64,554 | 6/55 | France. |
| 819,601 | 11/51 | Germany. |
| 585,887 | 2/47 | Great Britain. |

OTHER REFERENCES

Behrend: B 14570 XII/47 Oct. 31, 1956 (German printed application).

EDWARD C. ALLEN, *Primary Examiner.*